(No Model.)
W. C. MATTESON.
GANG PLOW.
No. 594,092.  Patented Nov. 23, 1897.
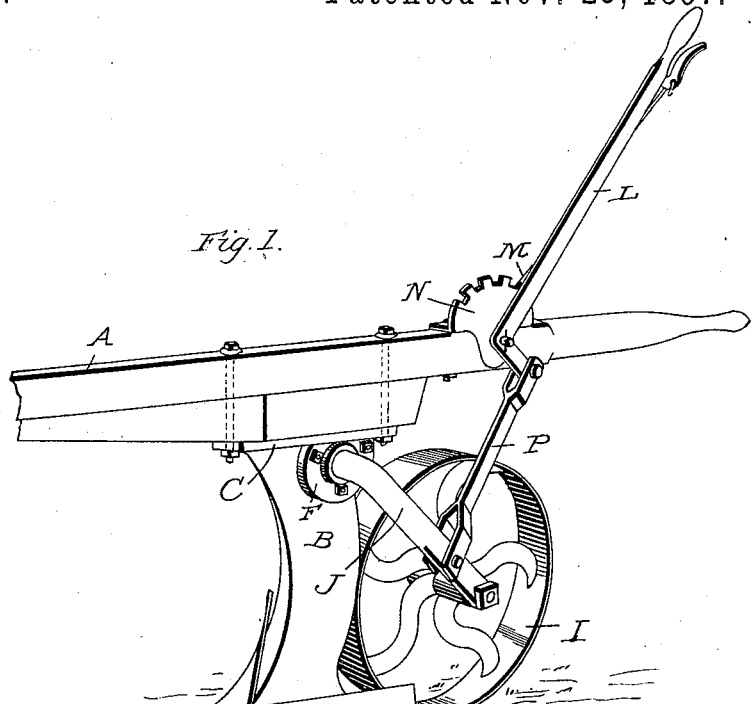
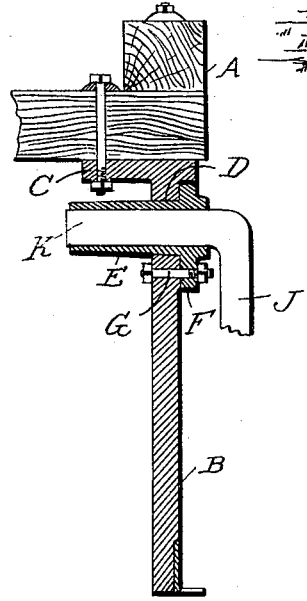
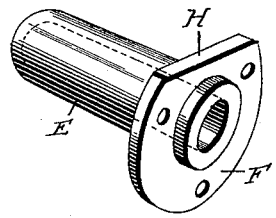
Witnesses:
C. H. Raeder
F. A. James
Inventor
W. C. Matteson
By James J. Shuby
Attorney

UNITED STATES PATENT OFFICE.

WALTER CARLOS MATTESON, OF STOCKTON, CALIFORNIA.

GANG-PLOW.

SPECIFICATION forming part of Letters Patent No. 594,092, dated November 23, 1897.

Application filed December 30, 1896. Renewed October 14, 1897. Serial No. 655,208. (No model.)

*To all whom it may concern:*

Be it known that I, WALTER CARLOS MATTESON, a citizen of the United States, residing at Stockton, in the county of San Joaquin and State of California, have invented certain new and useful Improvements in Gang-Plows; and I do declare the following to be a full, clear, and exact description of the invention, such as will enable others skilled in the art to which it appertains to make and use the same.

This invention relates to improvements in gang-plows and the like; and it has for its general object to provide a bushing in the standard of one of the plows to receive the shaft of the hanger which carries the gage-wheel, the said bushing being adapted to afford a broad bearing for said hanger, and being detachably connected to the plow-standard, so that when it is worn or otherwise impaired it may be readily removed and replaced by a new one without damage to the standard.

With the foregoing in view the invention will be fully understood from the following description and claims when taken in conjunction with the annexed drawings, in which—

Figure 1 is a perspective view of a portion of a gang-plow embodying my invention. Fig. 2 is an enlarged detail section taken through the plow-standard and the bushing therein and showing the hanger-shaft journaled in said bushing, and Fig. 3 is an enlarged perspective view of the bushing removed.

In the said drawings similar letters designate corresponding parts in all of the views, referring to which—

A indicates the main frame of a gang-plow or the like, which may be of any suitable construction, and B indicates the standard of the rear plow, which may be formed of cast-iron or other suitable metal. This standard B is preferably provided at its upper end with the flange C, for its connection to the frame A, and it is also provided at about the distance shown below said flange with the transversely-disposed aperture D. (Better shown in Fig. 2.) In this transverse aperture D is arranged my improved bushing E, which, if desired, may be formed of steel, so as to enable it to withstand frictional wear, and thereby prolong its usefulness. The said bushing E extends a considerable distance inwardly and laterally from the standard B, so as to afford a broad bearing for the shaft of the hanger, presently described, and it is provided at its outer end with the flange F. This flange F, which rests against the side of the standard, is detachably connected thereto by the transverse bolts G or other suitable means, and it is provided with the straight edge H, which, by bearing against the under side of the flange C, resists any tendency of the bushing to turn in the standard, and thereby takes all the strain off the bolts or other connecting means.

I indicates the gage-wheel, which may be of the ordinary or any suitable construction.

J indicates the hanger, which carries the wheel I, and has its shaft K journaled in the bushing E, and L indicates the lever for adjusting the hanger J. This lever L is fulcrumed on the frame A, and is provided with a detent M to engage the segmental rack N, whereby it will be seen that the hanger J, with which the lever is connected by link P, may be adjustably fixed in various positions.

It will be readily appreciated from the foregoing that the connection described of the hanger J with the plow is very strong and durable, and it will also be appreciated that the bushing is the only part subjected to frictional wear and that when worn it may be readily removed and replaced by a new one at a small cost, and this without in any way injuring the standard B.

Having thus described my invention, what I claim is—

1. In a gang-plow the combination of a frame, a plow connected to the frame and having the transversely-disposed aperture in its standard, a bushing arranged in said aperture and detachably connected to and extending laterally from the standard so as to form a broad bearing, a gage-wheel, a hanger carrying said wheel and having a shaft journaled in the bushing, and means for adjusting and adjustably fixing said hanger with respect to the frame, substantially as specified.

2. In a gang-plow, the combination of a frame, a plow having a standard provided with a transversely-disposed aperture and also provided at its upper end with a flange connected to the under side of the frame, the bushing arranged in the aperture and extending laterally therefrom and having the flange at one end, detachably connected to the standard and provided with the straight edge bearing against the flange of the standard, the gage-wheel, the hanger carrying said wheel, and having the shaft journaled in the bushing, and suitable means for adjusting and adjustably fixing the hanger with respect to the frame, substantially as specified.

In testimony whereof I affix my signature in presence of two witnesses.

WALTER CARLOS MATTESON.

Witnesses:
GEORGE RUSHFORTH,
WALTER E. WILLIAMS.